United States Patent
Bock et al.

(10) Patent No.: US 7,675,998 B2
(45) Date of Patent: Mar. 9, 2010

(54) METHOD AND CIRCUIT FOR DETERMINING A CLOCK SIGNAL SAMPLING INSTANT FOR SYMBOLS OF A MODULATION METHOD

(75) Inventors: Christian Bock, Freiburg (DE); Franz-Otto Witte, Teningen (DE); Carsten Noeske, Sexau (DE)

(73) Assignee: Trident Microsystems (Far East) Ltd. (KY)

( * ) Notice: Subject to any disclaimer, the term of this patent is extended or adjusted under 35 U.S.C. 154(b) by 426 days.

(21) Appl. No.: 11/112,875

(22) Filed: Apr. 22, 2005

(65) Prior Publication Data

US 2008/0112509 A1 May 15, 2008

(30) Foreign Application Priority Data

Apr. 26, 2004 (DE) ........................ 10 2004 020 300

(51) Int. Cl.
*H03D 1/24* (2006.01)
(52) U.S. Cl. .................... 375/320; 375/326; 375/332
(58) Field of Classification Search ................ 375/261, 375/354, 371, 279, 320, 326, 332; 327/9, 327/33, 45
See application file for complete search history.

(56) References Cited

U.S. PATENT DOCUMENTS

| | | | |
|---|---|---|---|
| 4,843,616 A * | 6/1989 | Hoffmann | 375/327 |
| 4,866,739 A | 9/1989 | Agazzi et al. | |
| 5,079,512 A * | 1/1992 | Muto | 329/304 |
| 5,513,209 A * | 4/1996 | Holm | 375/354 |
| 5,671,257 A * | 9/1997 | Cochran et al. | 375/355 |
| 5,767,739 A | 6/1998 | Witte | 27/38 |
| 6,154,510 A | 11/2000 | Cochran et al. | |
| 6,215,830 B1 * | 4/2001 | Temerinac et al. | 375/326 |
| 6,882,618 B1 * | 4/2005 | Sakoda et al. | 370/208 |
| 2004/0105396 A1 * | 6/2004 | Eudes et al. | 370/277 |
| 2005/0249314 A1 | 11/2005 | Bock | |

FOREIGN PATENT DOCUMENTS

| | | | | |
|---|---|---|---|---|
| DE | 195 40 250 | 2/1997 | | 27/38 |
| DE | 199 20 334 | 11/2000 | | 27/34 |

OTHER PUBLICATIONS

Kammeyer, K.D., "Nachrichtenubertragung," Verlag B.G. Teubner, Stuttgart, 2. Auflage 1996 im Kapitel 5.7.3" Adaptiver Entzerrer mit quantisierter Ruckfuhrung" Seiten 200-202; im Kapitel 5.8.3. "Entscheidungsruckgekoppelte Taktregelung" Seiten 213-215; im Kapitel 12.2.2 "Entscheidungsruckgekoppelte Tragerphasenregelung im Basisband" Seiten 429-431. (English and German languages).

* cited by examiner

*Primary Examiner*—David C Payne
*Assistant Examiner*—Rahel Guarino
(74) *Attorney, Agent, or Firm*—DLA Piper LLP (US)

(57) ABSTRACT

The invention relates to a method for determining the sampling instant of a clock signal ($t_i$) for a circuit for determining symbols (Se) from a digitized signal (sd, S) which is coupled to at least one quadrature signal pair of a modulation method (QAM), wherein the digitized signal is converted to polar signal coordinates (R, α) with a radial component (R).

14 Claims, 6 Drawing Sheets

METHOD AND CIRCUIT FOR DETERMINING A CLOCK SIGNAL SAMPLING INSTANT FOR SYMBOLS OF A MODULATION METHOD

PRIORITY INFORMATION

This application claims priority from German patent application 10 2004 020 300.8 filed Apr. 26, 2004.

BACKGROUND OF THE INVENTION

The invention relates to determining a sampling instant of a clock signal for a circuit for determining symbols from a received, specifically, complex modulated signal.

In the reception of digital signals coupled to a quadrature signal pair, the sampling frequency and sampling instant of a clock signal are a critical factor to ensure rapid locking-in of decision-feedback control loops. These control loops are found, for example, for the purpose of setting sampling instants when an equalizer is adjusted which eliminates linear distortions in reception of the quadrature signal pair, or during carrier-frequency or carrier-phase control.

The symbols thus received, and specifically, coded symbols, which form the actual data, represent a single-digit or multi-digit digital value in coded form. The coding is implemented for transmission via the quadrature signal pair which corresponds to a pointer that occupies discrete positions within the Cartesian amplitude and phase space of the quadrature signal pair at defined instants in time. These instants follow each other at equidistant intervals and must be hit as precisely as possible by the sampling clock. Conventional transmission methods of this type are Quadrature Amplitude Modulation (QAM) and Phase Shift Keying (PSK).

In a conventional receiver for receiving digital signals, a complex multiplier or mixer, which is controlled by a local oscillator, mixes the received QAM signal, modulated in-phase and in the correct frequency onto a carrier, into the base band of the circuit. With digital processing, this can occur before or after analog-to-digital (A/D) conversion. The signal is sampled either at the symbol clock or multiple thereof, or the digitization clock is free-running relative to the required symbol clock. In this last case, the signal is ultimately converted to the symbol clock or multiple thereof by a purely digital sampling rate conversion. Gain controls ensure that the relevant control range is utilized and that the received signals are correctly mapped to the symbol decider stage. An adaptive equalizer reduces intersymbol interference originating in linear distortions of the transmitter, transmission path, or receiver.

In high-order demodulators for QAM or PSK signals, the control circuits require the received signals as well as those elements of the predefined symbol alphabet viewed as the most probable by the decider stage for the frequency control and phase control of the local oscillator, for recovery of the symbol clock, and for the adaptive equalizer. This type of control via the decision-based symbol is called "decision-feedback" control.

Since the decision-feedback controls in prior-art digital demodulators are interconnected, locking in is difficult so long as the control for the carrier of the local oscillator mixing the received signal into the base band is no yet stable in regard to frequency or phase. Locking in often succeeds only whenever the given frequencies or phases are in relatively close proximity to their required values. Examples of decision-feedback controls are found in the text on basic principles by: K. D. Kammeyer, "Message Transmission," [*Nachrichtenü-bertragung*], Verlag B. G. Teubner, Stuttgart, $2^{nd}$ edition 1996, in chapter 5.7.3 "Adaptive equalizer with quantized feedback," pages 200 to 202, in chapter 5.8.3 "Decision-feedback clock control," pages 213 to 215, and in chapter 12.2.2 "Decision-feedback carrier phase control in the base-band," pages 429 to 431.

Circuits designed as demodulators usually use one of two timing recoveries in order to supply a suitable sampling instant for the clock of the circuit. These involve either obtaining the clock signal by nonlinear distortion of the input signal, such as rectification or exponentiation, preferably, with the number of symbols, and subsequent bandpass filtering of the result at the expected symbol rate, or a decision-feedback timing recovery.

The first-named method is too imprecise, especially in the case of high-order modulation methods. The second method requires an in-phase baseband signal right from the start to enable the correct symbol decisions. For this purpose, carrier frequency and carrier phase control must have already locked in, an essentially impossible action, however, since due to the unknown sampling instant the symbols cannot yet be detected, and thus the decision-feedback control of carrier frequency and carrier phase cannot yet have locked in.

Therefore, there is a need for a system and method for determining the sampling instant of a clock signal for a circuit for determining symbols taken from a digitized signal which is coupled to at least one quadrature signal pair, and to improve a corresponding circuit.

SUMMARY OF THE INVENTION

A method of determining the sampling instant of a clock signal for a circuit for determining symbols or symbol codes with discrete amplitudes as taken from a digitized signal of a modulation method, includes the step of converting the digitized and demodulated signal into a radial component, and determining the quality value of the signals based on a radius-referenced position of the signals in a first sampling phase which is defined relative to a base clock instant of a base clock. The method also includes determining an additional quality value for signals in a sampling phase ($\phi_{i2}=\phi_i+\Delta\phi$) varied relative to the prior sampling phase, ascertaining the better of the determined quality values, and subsequent utilization of the sampling phase of the better quality value and/or the subsequent variation of the sampling phase.

A circuit comprises a clock control device to output clock signals at discrete instants, and a polar coordinate converter to determine at least one radial coordinate of a digitized signal of a modulation method having discrete amplitudes at symbol instants. The circuit also includes at least one storage device to store the operating parameters and radial components of the symbols, a control device to control the operational sequence and to determine the sampling instant of the clock signal, wherein the control device and/or additional components are constructed and designed to vary the sampling phase relative to a base clock instant of a base clock, and to determine quality values for signals which are determined at different, varied sampling phases, specifically, as a function of the spatial position of the determined symbols relative to at least one radius in the coordinate system of the radial components.

The goal is achieved based on considerations relative to the distribution of the received and determined, or sampled, signals relative to desired radii. Here a sampling quality is defined that is independent of the state of the carrier control, and as necessary, from the amplitude control; whereupon the attempt is made to increase this sampling quality in order thus to determine the correct sampling frequency and correct sampling phase.

The signal vector of the transmitted analog baseband signal drifts within the I,Q-space from one transmitted coded symbol (reference symbol) to the next. The dwell time on a coded symbol point, or in the vicinity thereof, on the one hand, and the speed and path between symbol instants, on the other hand, is determined according to the known approach by transmitter and receiver filters (Nyquist filters). The signal vector is expected only at the exact symbol times precisely on a coded symbol, whereas the signal vector is able on average to be assigned to an increasingly smaller degree to one symbol the further one moves with the sampling phase to the midpoint between two sampling instants.

The reference symbols, or symbols of their coding, may be expressed not only in Cartesian coordinates (I,Q) but also in polar coordinates (R, α), such that each symbol is defined by a desired radius and reference angle. In commonly used modulation techniques, such as 64-QAM, the number of different desired radii is significantly smaller than the number of symbols since many symbols differentiated by different phase angles can lie on one desired radius.

If the signals in the receiver, which correctly renders the amplitudes and for which the carrier frequency and carrier phase control have locked in, are sampled in a temporally correct manner, that is, in-phase, the positions of the received signals within the complex amplitude and phase space agree with those of the transmitted symbols or symbol codes. If, given correct sampling, the carrier frequency control and carrier phase control have not yet locked in—which condition can cause a rotation or tilting of the complex amplitude and phase space—the phase angles of the signals and thus the Cartesian coordinates may also be affected; whereas this is not the case for their radial components, however, since they are not affected by an angular error of the receive amplitude and receive phase space. Thus given correct sampling and correct gain, all the radii of the received signals continue to fall on the desired radii or on the radii defined by the symbols independently of the carrier control, which fact is advantageously exploited by this approach.

In the event the received signal is available only in Cartesian coordinates, it is possible to use known methods for determining the radial component from the Cartesian coordinates—for example, by the Pythagorean equation, by tables, by approximation techniques, or using a control circuit.

From the distribution of the radial components of the received signals, it is possible to derive a sampling quality for the instantaneously selected sampling frequency and phase, which quality is independent of the state of the carrier frequency and carrier phase control. The sampling quality becomes progressively higher, the more there are of the radii of the received signals lying on the desired radii, or in the immediate vicinity thereof.

The quality can be ascertained, for example, by determining the distance of the received radius from the nearest desired radius. The quality becomes progressively higher, the lower the average of the distances; an ideal sampling is present when each radius of a received signal lies on a desired radius, and the distances are thus zero.

Alternatively, the radii of the received signals can be sorted, for example, into a decision grid which includes all the desired radii to be examined. It is also possible to determine sampling quality based on a density distribution (histogram) obtained in one test having a sufficient number of received signals with the same sampling frequency and sampling phase by evaluating the number of received signals falling on the desired radii or within their close proximity. To this end, all the results on or around the desired radii are added up, then placed as necessary in a ratio to the total number of signal values or sampling values received in this test, or in a ratio to the number of signals for which the radii fall in the spaces between the desired radii.

For higher-order modulation methods having a plurality of very closely positioned desired radii and distances relative to other individually located desired radii, it is advantageous for the determination of sampling quality to examine only individual radii regions selected from the plurality of desired radii. When examining the radii regions it is advantageous to analyze not only the exact annulus but also the tolerance zone around the desired radii region. It is also possible here to perform a weighting whereby signals directly on the expected radius value are weighted more highly than signals which are determined within the adjacent region of a given desired radius or of the associated annulus in the polar coordinate plane.

In an evaluation of the density distribution for the radii, or of the histogram, by nonlinear methods, such as forming the power by squaring, accumulations are often favored in the result. Whereas a uniform distribution of all received radii is expected with an unfavorable sampling phase, a low variance, that is, accumulation for the desired radii, occurs only in a favorable sampling phase—specifically, all the more so the better the sampling phase hits the actual temporal phase position of the received symbol or symbol code. A sampling quality signal by such an evaluation is independent not only of the state of the carrier control, but also of the state of the gain control, since the fact of accumulation of results around the desired radii is not affected by the amplitude scale of the receiver. No information is required about the absolute position of the desired radii on the amplitude scale of the receiver.

This method of evaluation without predetermined absolute values for the desired radii is also usable in the event the position of the desired radii is not known ahead of time, for example, for multi-transmitter/multi-antenna technology (transmitter diversity), as long as the two transmitters are using a shared oscillator, and as long as the symbol sampling instants are identical. However, the number of desired radii proportional to the product of the modulation alphabet does increase due to the quasi-independent symbols for the time-space code, or to the absolutely independent symbols.

Appropriate messaging methods enhance the quality of a quality signal obtained by the above-described methods.

A change in the sampling phase by a certain absolute value given the same sampling frequency may possibly show a higher or lower value for the sampling quality. By continuous systematic repetition of these tests, along with changing the sampling phase in the direction in which the sampling quality becomes higher, it is possible iteratively to find the optimal sampling phase. The step size of the change in the sampling phase here can be adjusted to the progress of the method.

In one possible embodiment, the sampling circuit and following components are designed in double form, the two sampling circuits operating with slightly differing sampling phase positions. By comparing the sampling quality values resulting from these two circuit sections, it is possible to derive the control direction in which better sampling of the signal can be expected.

In another possible embodiment, the sampling phase position is periodically changed slightly. This type of modulation of the sampling phase position may result in a modulation of the sampling quality value, where the phase position for the modulation of the quality value indicates the control direction in which better sampling of the signal is expected.

All the above methods may also work with the radius squares of the received signals instead of with the radii of the received signals. This may possibly eliminate the step of taking the square root when calculating the input signal of quality detection.

Advantageously, it is possible to continuously monitor an ascertained sampling phase position for optimal sampling by one of the above methods. A continuous change in the ascertained sampling phase position indicates a frequency difference between the transmitted symbol frequency and the selected sampling frequency in the demodulator. The first derivative of the optimal phase position produces a value for the necessary correction of the selected sampling frequency.

One application of the method or corresponding circuit arises in particular for binary or complex digital modulation methods such as PSK and QAM.

Using the known approach, it is thus possible to determine the radial component of the digitized signal using a method for determining the sampling instant of a clock signal for a circuit for determining symbols from a digitized signal that is coupled to at least one quadrature signal pair of a modulation process. In a first sampling phase position of a base clock defined relative to a base clock instant, one sampling quality is then determined before another sampling quality is determined for a later varied sampling instant that is varied relative to a base clock instant of the original base clock by a differential clock pulse duration. By selecting the differential clock pulse duration to be smaller than a whole clock pulse duration, or one not equal to a whole-number multiple thereof, the sampling instants shift relative to the original received analog signal, which fact is reflected in the sampling quality of the acquired symbols.

Only for an ideally selected sampling phase position relative to the symbol clock is it possible to obtain an optimum sampling quality. As a result, it can be assumed that as a rule the sampling quality for the first determination and for the later determination with a varied sampling phase position will be different. For the decision about the better sampling phase position, that sampling phase position is selected for which accordingly the greater sampling quality from among the determined sampling qualities was determined. For future sampling phase positions relative to the base clock instant of the original base clock, an instant is therefore selected which is thus temporally shifted by that differential clock pulse duration which was used for the higher sampling quality, so long as a higher sampling quality has not already been ascertained during the first determination. This procedure may, of course, be repeated so that an additional shift in the same direction or opposite direction is used to determine whether the ideal sampling instant has in fact already been ascertained.

One application of the method or corresponding circuit arises in particular for binary or complex digital modulation methods such as BPSK (Binary Phase Shift Keying), QPSK and QAM. Modulation methods of this type are employed by most current radio, television, and data services using cable, satellite, and, to some extent, terrestrial means.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
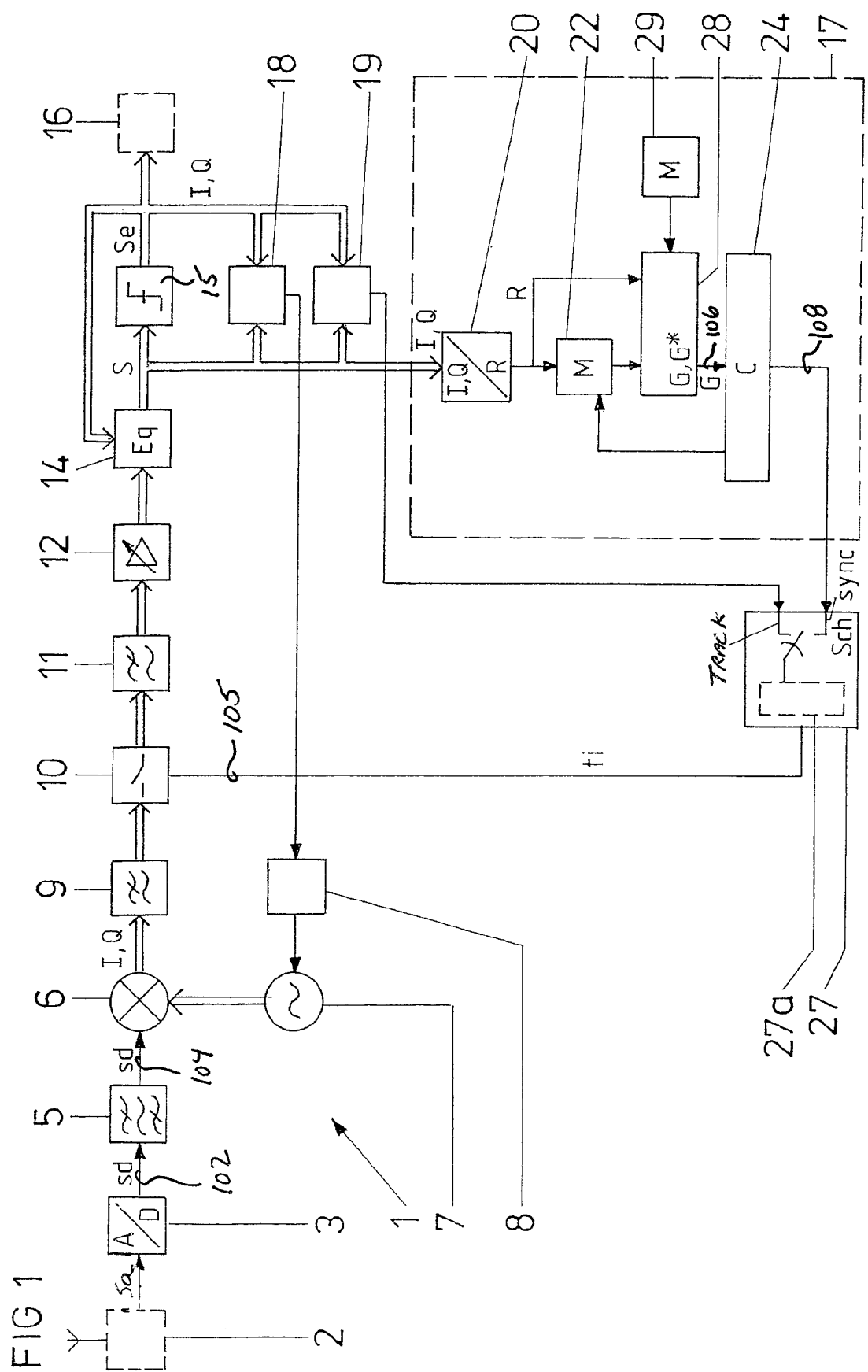
FIG. 1 illustrates a circuit for determining symbols from a digitized signal that is coupled to at least one quadrature signal pair of a modulation process, wherein the circuit has a device for determining the sampling instant of the clock signal, and the symbol is obtained by purely digital sampling rate conversion in connection with a free-running A/D converter.

As FIG. 1 shows, a demodulator 1 is composed of plurality of individual components and exemplifies a circuit for determining symbols Se from a digitized signal sd on a line 102 that is coupled to a quadrature signal pair from a modulation method, for example, one using the QAM standard. These may also be part of an integrated circuit, either all together or individually. In particular, the components described below may either be omitted or augmented by additional components, depending on the application. The relaying of signals in the form of real signals, complex signals, or individual complex signal components is correspondingly adaptable as a function of the application and specific circuit.

In the embodiment shown, the demodulator 1 receives an analog signal sa at an input of a signal source 2, for example, a tuner. This analog signal sa, which is normally provided in a band-limited intermediate frequency position, is fed to an analog-to-digital (AD) converter 3 for conversion to a digital signal sd. The digital signal sd is input to a bandpass filter 5 which removes steady components or interfering harmonics from the digital signal and provides a filtered signal on line 104.

The signal on the line 104 is input to a quadrature converter 6 which converts the filtered signal on the line 104 to baseband. The baseband corresponds to the requirements of the demodulator 1 and the modulation method being used. Accordingly, the quadrature converter 6 outputs the two quadrature signal components I, Q of the Cartesian coordinate system. For the purpose of frequency conversion, the quadrature converter 6 is in the usual way supplied from a local oscillator 7 with two carriers offset by 90°, the frequency and phase of which are controlled by a carrier control device 8. The quadrature signal components I, Q are fed to a lowpass filter 9 which removes interfering harmonics. The thus filtered quadrature signal pair I, Q, or the two quadrature signal components I, Q, are then fed to a symbol sampling device 10. Control of the symbol sampling device 10 is effected through an input to which the sampling signal $t_i$ on line 105 is fed. In the normal operating state, the symbol sampling instants $t_i$ are governed by the symbol frequency 1/T, and normally as well by the precise phase position of symbol Se contained in received signal sd.

Symbol sampling instants $t_i$ are generated in a sampling control device 27 which is composed of a switch and the actual functional unit 27a.

The output signal from the sampling device 10 is filtered by a lowpass filter 11 using a Nyquist characteristic, then fed to a gain control device 12 which adjusts the average signal strength to the expected value for the modulation scheme used and optimally utilizes the modulation range of a symbol decider 15. The signal supplied by gain control device 12 is fed to an equalizer 14. Equalizer 14 removes interfering distortions from the two components of quadrature signal pair I, Q, and provides a signal S at its output. Symbols Se are then generated from the thus-provided sampled signals by the symbol decider 15.

The signals S and symbols Se are then fed directly or indirectly to additional digital signal processing devices 16, and preferably as well to the decision-feedback control circuits or components in the demodulator 1.

In particular, the signal flows S and signal flows Se are compared in the equalizer 14, in order to adapt the filter coefficients, and in a phase error detector 18 to detect phase errors and frequency errors of the carrier control, and then drive a carrier control device 8 accordingly. The signals S and symbols Se are also input to a sampling error detector 19 in order in the locked-in state to detect errors in the sampling frequency and sampling phase, and then drive the sampling control device 27 accordingly. The phase error detector 18 and the sampling error detector 19 obtain, as input signals, signal S supplied by the equalizer 14 and symbol Se supplied by the symbol decider 15.

As long as the carrier control, along with diverse components, in particular, the phase error detector 18, the carrier control device 8, the local oscillator 7, and the quadrature converter 6, has not yet locked in, a special detection circuit 17, as part of or as an additional component to a clock control device, provides the input signal for the sampling control device 27. The detection circuit 17 is composed of a plurality of components, all or some of which can be accommodated within a single integrated circuit or circuit component. In the detection circuit 17, a coordinate converter 20 determines the radius of complex signal S supplied to it from the equalizer 14, which signal is present in the Cartesian coordinate system I, Q. This can implemented using the equation $R=\sqrt{(I^2+Q^2)}$, using a table, an approximation method, or also the Cordic algorithm.

It is possible to implement all subsequent steps in the detection circuit 17 as well on a scale spanned by $R^2$, or in a space spanned by $R^2$. This approach eliminates the need for the often complicated calculation of the square root. The table described below and other methods must be adapted accordingly.

The detection circuit 17 includes quality value circuit 28 to which at least the radius component R is fed from the coordinate converter 20, and which outputs a signal G on line 106 which represents the quality of the sampling to a control device 24, which in turn outputs a thus-determined sampling control signal on a line 108 to a sampling control device 27. In addition, the quality value circuit 28 is connected to two storage devices 22 and 29, the first of these storage devices 22 being also fed at least radial component R from the coordinate converter 20. The first storage device 22 is designed such that it generates a histogram from the supplied radial component R. The second storage device 29 contains a table with desired radii Ra-Ri.

In order to control the first storage device 22, the quality value circuit 28, and additional components of the demodulator 1, these are connected to a control device 24. The control device 24 implements a normal operational sequence and controls the individual components and operational sequences according to appropriate hardware- and software-based instructions. Preferably, the control device may also have the functions of either some or all of the above components integrated into it.

Figures 2A, 2B, 2C:
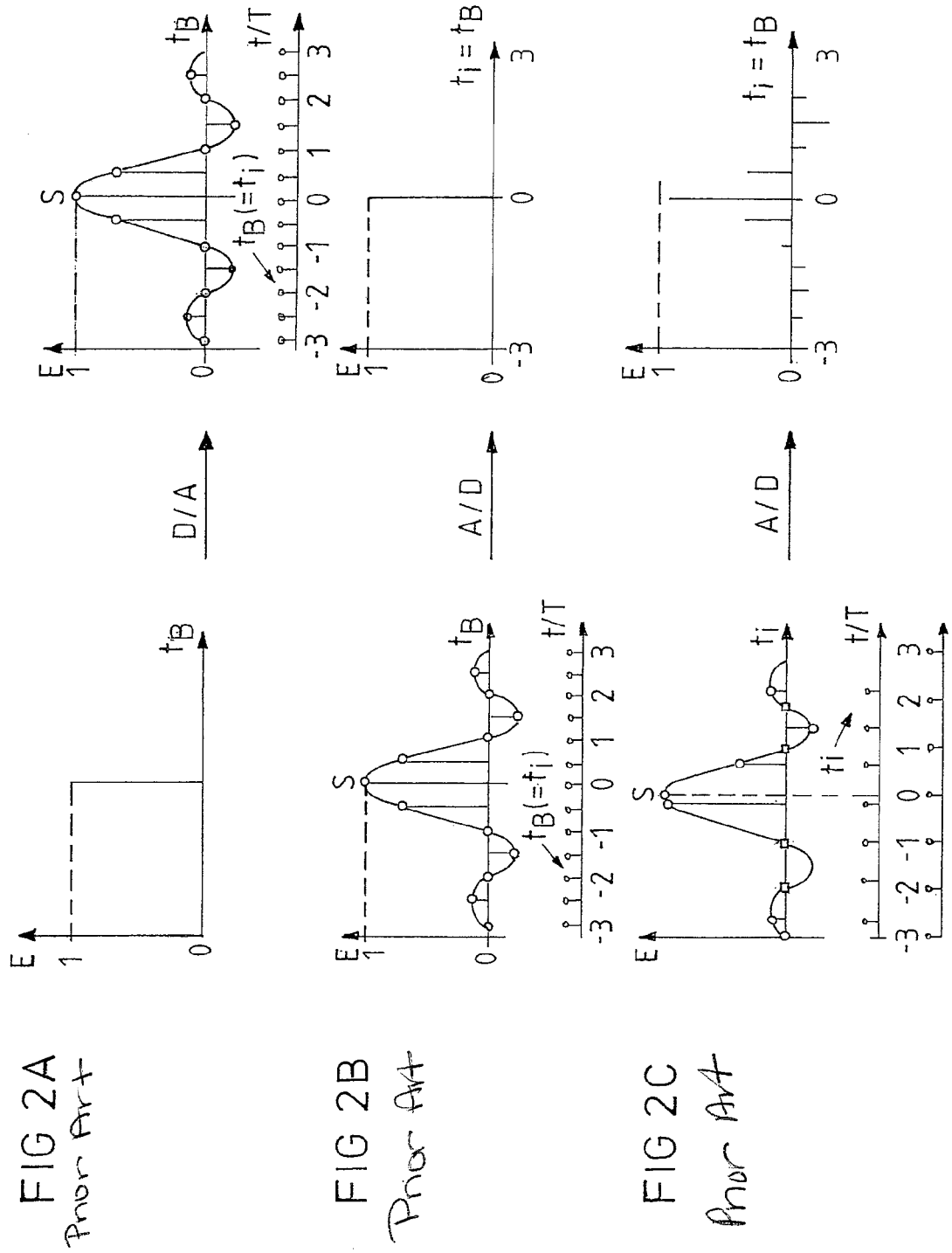
FIGS. 2A-2C are known representations of signals in the digital and analog range of a transmitter, together with correct clock selection and incorrect clock selection by a receiver.

Before describing the operational sequence to provide an optimized sampling signal $t_i$, the following discussion will describe the principles of standard signal processing exploited for this purpose, along with their utilization within the circuit. In FIGS. 2A-2C are diagrams illustrating an ideal pulse diagram and an analog Nyquist wavelet to the right and left of a digital-to-analog conversion or an analog-to-digital conversion. An amplitude E is plotted on a time axis t on which discrete base clock instants $t_B$ are marked. FIG. 2C also shows a time axis with actual sampling instants $t_i$ which are offset relative to base clock $t_B$.

On the transmitter side, for example, a pulse of amplitude 1 is supplied and converted to an analog Nyquist wavelet (FIG. 2A).

FIGS. 2B and 2C show a wavelet received by the receiver. FIG. 2B starts with an ideally synchronized sampling signal in which a sampling instant falls on the maximum central value of the wavelet, while the other sampling instants each fall on zero crossings of the wavelet and thus do not produce any signal quantity. The outputted digital pulse thus has the reconstructed original amplitude value E=1. In this embodiment, these Nyquist conditions are involved only indirectly. The vector moves within the phase space from one symbol code or Se to the next. If it lies anywhere on the path between these, it cannot lie on a symbol code. What is ultimately sought is the correct positions for the pointer which are present in the case of a correctly determined sampling phase and sampling frequency.

The example of FIG. 2C starts with a temporally offset clock signal for which, instead of the central maximum amplitude value of the wavelet, a smaller amplitude value is sampled. As a result, after sampling, a central maximum amplitude value with a reduced amplitude E relative to the original amplitude value is outputted. In addition, the amplitudes of adjacent sampling signals, for which the instants now no longer fall precisely on the zero positions of the wavelet of the examined symbol, are now correspondingly affected by the examined symbol and vice versa—indeed, all the more, the further the sampling instant deviates from the ideal sampling instant.

In the event of non-ideal sampling in FIG. 2C, correspondingly interpolated sampling values for subsequent processing as data are provided by the symbol sampling device 10. During transmission of a digital data stream, the individual Nyquist pulses are in part superimposed on each other timing-wise and outputted as I- and Q-components from the symbol sampling device 10. In the I,Q signal value plane, which simultaneously represents the symbol code plane and phase plane, the coordinates of points are detected based on those samplings deviating from the ideal instants, which points lie on the path of the phase vector from one symbol code to the next.

Figure 2D:
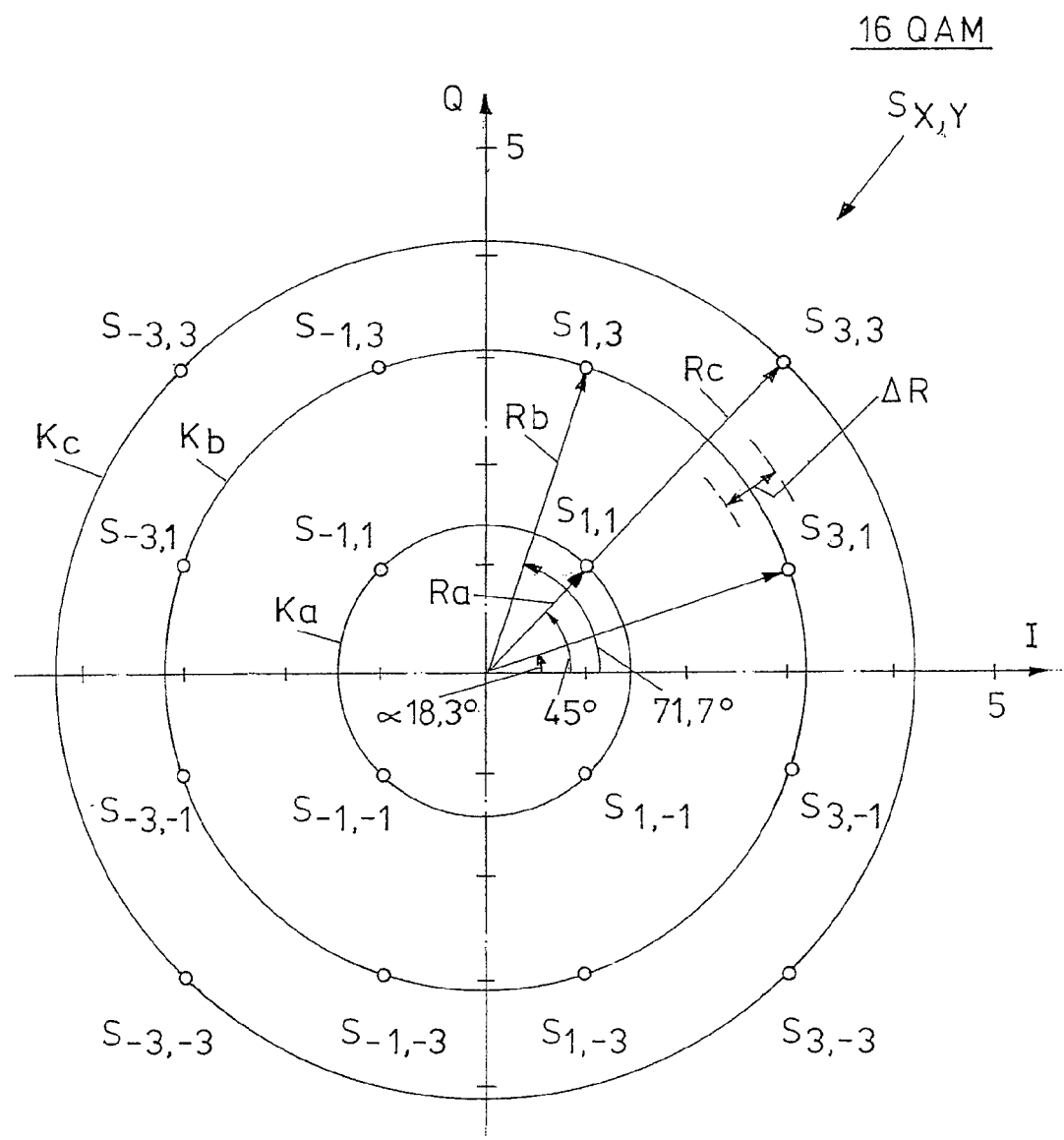
FIG. 2D is a diagram of a 16-QAM symbol arrangement within a Cartesian complex coordinate space.

FIG. 2D plots the Cartesian coordinates spanned by a quadrature signal pair I, Q in which the corresponding positions are recorded for sixteen (16) symbols $S_{x,y}$ of a 16-QAM signal. The subscripts x,y here correspond to the respective Cartesian coordinates for which the sixteen symbols should be detected for ideal sampling. Illustrated are circles Ka, Kb, Kc on which the symbols $S_{x,y}$ lie according to the requirements of the 16-QAM method. If the scale of the coordinate systems is chosen such that the innermost symbol of the first quadrant lies at (1, 1), radius values $R_a=1.41$; $R_b=3.16$; or $R_c=4.24$ are assigned, as calculated from the coordinate origin, to circles Ka, Kb, Kc. In order to define the signals $S_{x,y}$ as a function of their polar coordinates R, α, the respective angular components α are required. Calculation of the polar coordinates, at least of their radial components or the squares thereof, is performed in the above-described circuit in the coordinate converter 20.

Figure 3A:
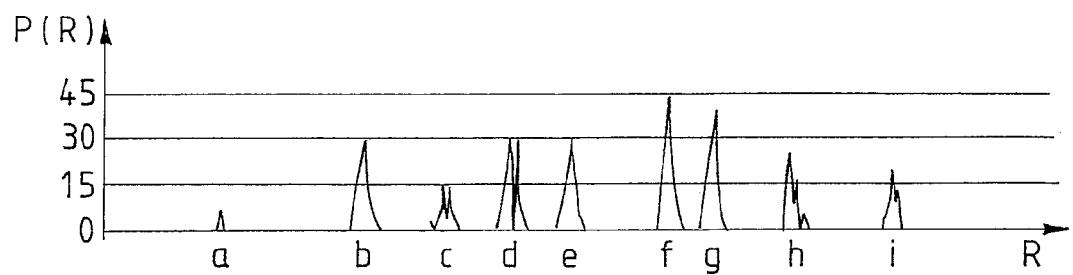
FIGS. 3A, 3B show a rate-of-occurrence distribution over the radius, or a signal distribution within the complex polar symbol space diagram of 64-QAM.

FIG. 3A shows the distribution of the radial component R after output of the polar coordinates from the coordinate converter 20 in a 64-QAM system. What is diagramed here is the frequency of the radii of the signals S outputted by the equalizer 14 and converted to polar coordinates by the coordinate converter 20. The same applies analogously for the use of the square $R^2$ of the radial component R.

Figure 3B:
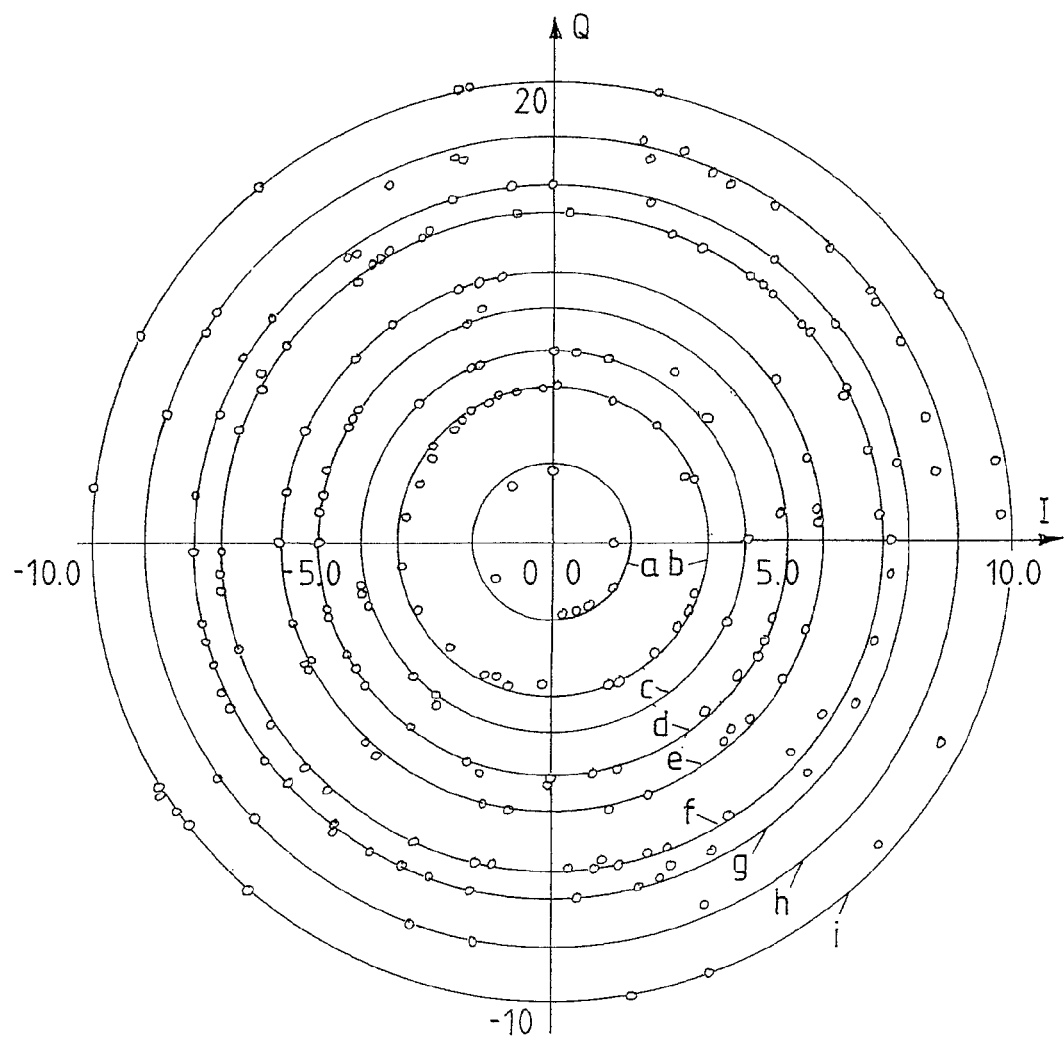

FIG. 3B illustrates an example of the positions of determined or sampled signals in the 64-QAM system. In addition to the signals ascertained or determined by the small circles, annuli a-i are also shown which are defined or specified by the radii $R_a$-$R_i$ required by the modulation system.

A comparison of FIGS. 3A and 3B reveals a count of 8 symbols on the inner circle a, approximately 34 symbols on the following circle b, and approximately 17, 33, 44, 39, 26 and 19 determined symbols on or in the region of the following annuli c-i.

With reference to FIGS. 2A-2D and 3A, 3B, the following discussion provides a method for determining an optimized sampling instant during the beginning of a receive period in which the carrier control (18, 8, 7, 6) has not yet locked in.

The illustrated rate-of-occurrence distribution for the radii of sampled complex signals here is the fundamental criterion for the quality signal or quality value determination since the radii, unlike Cartesian coordinates, are not affected either by frequency offsets or phase offsets. As a result, for the beginning of a receive period in which the carrier control has not yet locked in, and taking into account the specific modulation method used, the sampling instant is systematically varied by the detection circuit 17 in the sampling device 27 such that sampling quality signal G is optimized, and thus a correct sampling frequency position and sampling phase position are achieved.

Figure 4:
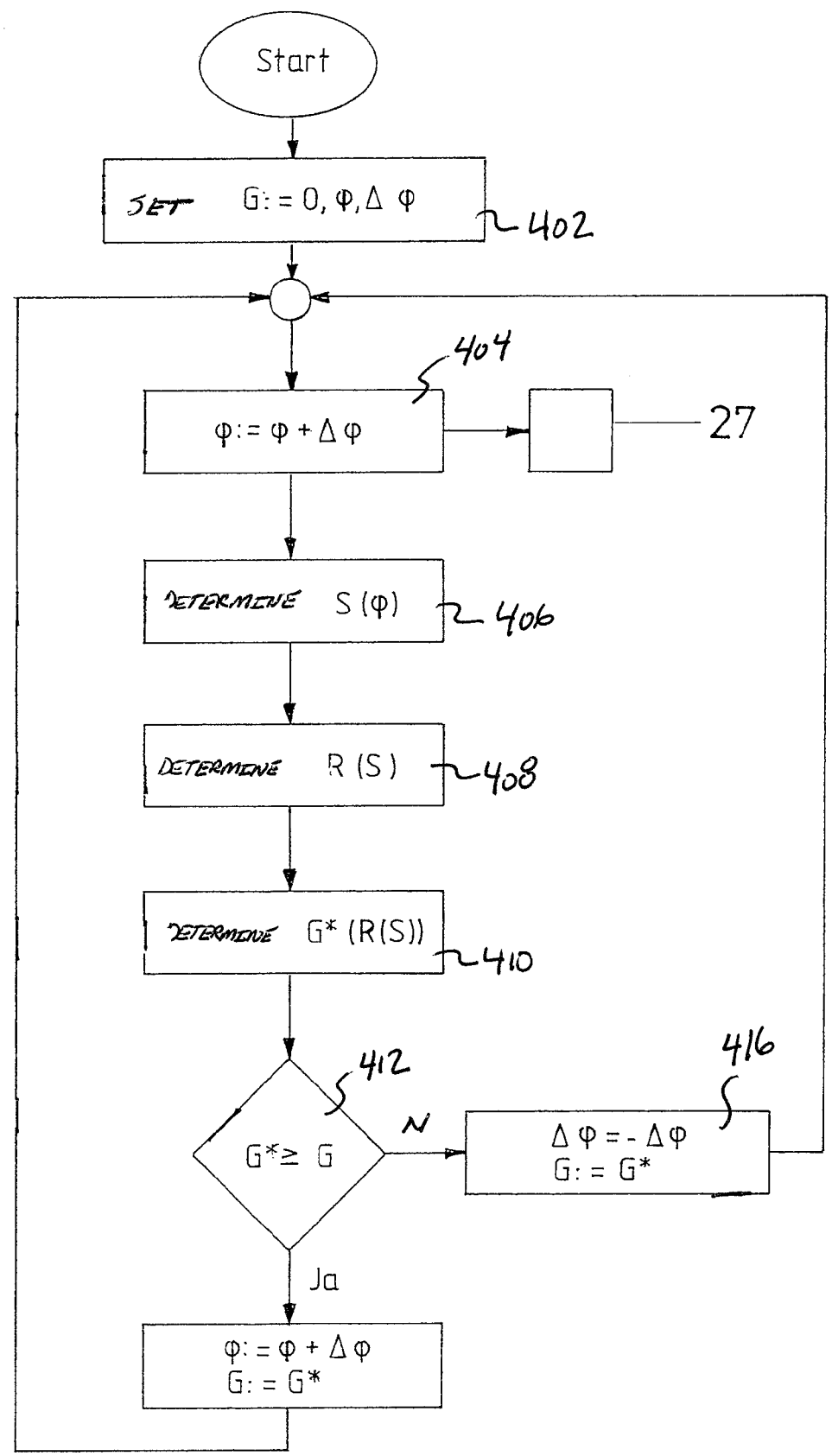
FIG. 4 is a flowchart showing the implementation of a method for determining the sampling instant.

An example of a operational sequence for the method begins in FIG. 4 with the assumption that carrier control 18, 8, 7, 6 has not yet locked in, and, as a result, a switch within the sampling control device 27 has not yet been moved into a first position "sync." In the sampling control device 27, the sampling frequency 1/T is chosen such that it matches the suspected symbol rate. The sampling phase can initially be randomly selected. In the embodiment shown, sampling signal $t_i$ generated in the sampling control device 27 is fed to the sampling device 10.

In a first test after startup of the program, parameters are defined in step 402. The quality value G is set to zero. In addition, the sampling phase φ or Δφ is defined. In step 404 the value of the sampling phase φ is then increased by differential sampling phase Δφ. This value is fed to the sampling control device 27.

Subsequently, for a defined number which is intended to show a statistic with, for example, 1000 symbols S for 9 desired radii, signal S (φ) is sampled in the sampling device 10 at the selected sampling frequency f and selected sampling phase φ in step 406. A radius is determined for each of the resulting sampled signals or signal values S in step 408. This thus defined decision grid may advantageously include all desired radii. The resolution is advantageously chosen to be great enough that the regions around the desired radii in which one expects all measured radii for an ideal sampling instant can be readily differentiated from the regions between desired radii on which one expects no results given an ideal sampling instant. Finally, the quality value G* for the sampling quality of this test is determined in the quality value circuit 28 from the number of received radius values lying on the desired radii and their immediate vicinity in comparison with the number of received radius values located off the desired radii in step 410. The values for the desired radii are held in the storage unit 29 (FIG. 1).

For a new test, a varied sampling phase $\phi_{i2}=\phi_{i1}+\Delta\phi$ is selected by the control device 24 (FIG. 1) and relayed to the sampling control device 27 (FIG. 1). With this new sampling phase, the radii are again calculated in step 408 for the defined number of symbols, and the sampling quality G* is determined in step 410.

If quality value G* in this new sampling phase is higher as determined in step 412, the sampling phase continues to be varied in this direction before another test 414. If step 412 determines that the new quality value G* is smaller, the sampling phase is varied in step 416 in another direction before another test. This procedure is continued until the correct sampling phase position is found. The size of variation for the sampling phase can be adjusted to the course of optimization.

The detection or acquisition circuit 17 is able to manage without information about the desired radii, and thus without the storage unit 29, if, in order to determine the sampling quality, the radii distribution available in the storage unit 22 after one test is examined for an accumulation around specifically discrete radii. This can be done by squaring the individual frequencies and subsequent summation. The higher the sum, the greater is quality value G, G*.

In place of tests with a defined number of symbols to determine quality value G, G* using a rate-of-occurrence distribution, the quality value circuit 28 may also be designed such that quality value G of the instantaneous sampling phase is determined continuously by determining the quality value for each symbol and by continued lowpass filtering of the result stream. To this end, the differences of the received radii relative to each closest desired radius, the values of which are stored in the storage unit 29, are determined, and these radius differences are then lowpass-filtered. The lower this result, the better the quality value G. Regions having many close-lying radii can be hidden, or the amount of the difference per result can be limited, or otherwise weighted. This variant works without the storage unit 22.

Use of this method is in principle possible with any newly received signals. However, in order to ensure reliable adjustment and preclude fluctuations in the received signals, it is also possible to temporarily store one or more of the received analog signals, or the digitized signals at a point before the symbol sampling device 10. As a result, the same signal sequences can always be used for the tests. The tests can always be implemented successively with the same stored signals of the specified number for different sampling instants $\Delta t_i$ or sampling phases $\phi_i$, $\phi_{i2}$. If parallel circuits or parallel structures of corresponding software are provided, it is also possible to run the tests for different sampling phases in parallel. In particular, there is the possibility of parallel examination of two sampling phases $\phi_i$ in order to detect the direction of variation toward the optimal phase position.

A found optimal sampling phase is advantageously monitored continuously. To this end, a comparison may be performed on the quality values G from tests with either advancing or lagging phase shifts relative to the optimal sampling phase. A continuous change in the optimal instant of the sampling phase indicates a difference between the transmitted symbol frequency and selected sampling frequency. Mathematically, the difference between the transmitted symbol frequency and the instantaneous sampling phase 1/T is obtained from the derivative of the shift of the optimal sampling phase. In this case, the control unit or control device 24 corrects the sampling interval T in the sampling control device 27 by changing the control voltage supplied to the sampling control device 27.

All these methods are based simply on observation of the radii of signal S and are independent of its phase position, and thus also independent of the state of the carrier control (18, 8, 7, 6).

Once the carrier control has finally locked in, the switch within the sampling control device 27 can be set to a second "track" position. What is supplied is now the output signal from the conventional sampling error detector 19 to which signal S before the decider 15 and symbol Se are supplied. The sampling is now controlled by the known decision-feedback sampling control.

Figure 5:
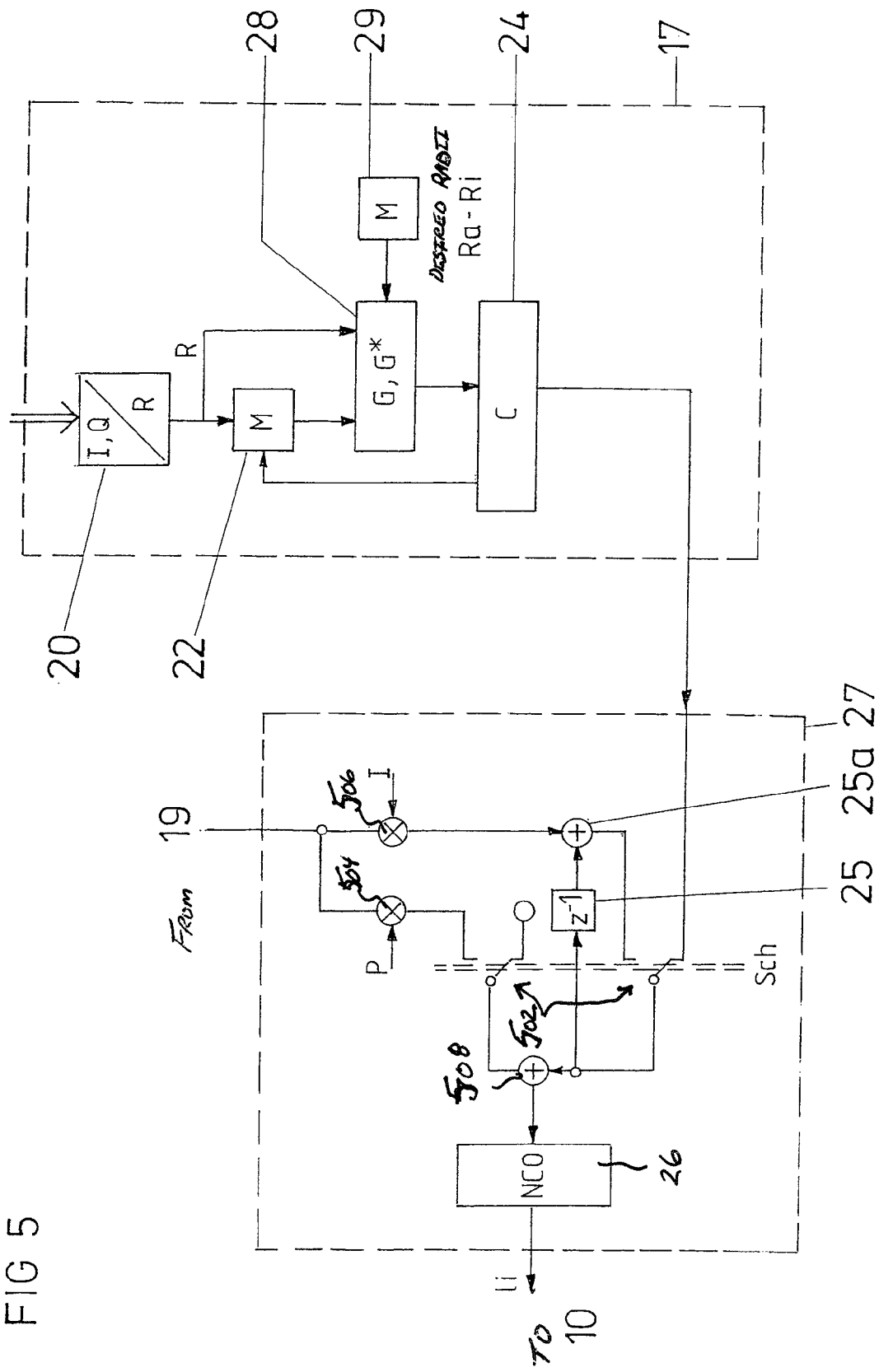
FIG. 5 shows a detailed section from a detection circuit of FIG. 1.

FIG. 5 shows an embodiment of the sampling control device 27. To avoid repetition, essentially only individual components are described here. Identical reference notations symbolize components or signals of identical or similar function and operation to those described above. In this embodiment, the sampling control device 27 includes a numerical oscillator 26, a double-pole switch 502, and a PI control filter which in turn is composed of two coefficient multipliers 504, 506 respectively for the proportional (P) and integral (I) gain component, an adder 508 to bring together the P and I controlled values, an adder 25a, and a delay element 25. The numerical oscillator is formed, in the simplest version, by an accumulator with modulo overflow. A previously defined state of the accumulator, for example, 0 or overflow generates the sampling signal $t_i$.

The numerical oscillator 26 accumulates the input value. A continuously applied value defines the frequency 1/T of sampling signal $t_i$. A value applied only in a system clock causes a phase shift for the sampling signal ti.

If the switch 502 is in the first position "sync", the control device 24 controls the numerical oscillator 26 and the content of the delay element 25. Using the above procedure, the control device 24 selects a sampling frequency by a constant, and a sampling phase by one-time superimposition of the angular difference relative to the old sampling phase onto the referenced constant. The rest of the procedure is as described above.

If the switch 502 is in the second "track" position, the sampling phase error is detected in the sampling error detector 19, and the sampling frequency is tracked, by a known method, by the PI controller with the proportional gain P and integral gain I, and by the numerical oscillator 26. In switching from "sync" to "track," the sampling frequency 1/T ascertained as correct by the detection circuit 17 remains stored in the delay element 25 which now forms an integrator together with the lower half of the double-pole switch 502 and the adder 25a, until it is possibly corrected through the multiplier with the coefficient I by a fault voltage coming from the sampling error detector 19.

The method is also applicable to other possible examples of arrangements for the circuit. For example, a centrally controlled sampling clock and digitization clock in the form of sampling signal $t_i$ can be fed to the AD converter 3 (FIG. 1). The sampling signal $t_i$ is ultimately synchronized precisely to the clock for the received symbol or signal sa. As a result, the need for subsequent interpolation in the sampling device as a separate functional unit (10 in FIG. 1) may also be eliminated. The lowpass filter 9 after the quadrature converter 6 is no longer necessary. Its limited action is taken over by the lowpass filter 11 with the Nyquist characteristic.

In particular, it is possible in alternative embodiments to employ the interface for the digitization, that is, the AD converter 3, only after the quadrature converter 6 which then is of an analog design, as is the local oscillator 7—for example, when the intermediate frequency position of the input signal sa supplied by the signal source 2 is too high.

The procedure starts with the assumption that the carrier frequency of the circuit, that is, of the demodulator 1 is not yet correct and that therefore the entire coordinate system of the circuit is rotating relative to the coordinate system of the input signal. This is why the conventional decision-feedback controls do not yet function. In the proposed procedure, this rotation can be ignored. The sampling clock which is required in the AD converter or in the following purely numerical sampling rate conversion is incorrect in terms of the phase, and may be incorrect to some degree in terms of the frequency as well. The goal of the procedure is to capture the sampling clock $t_i$.

The circuit 17 is provided for this clock acquisition. In this circuit, it is exclusively the radii R of the preliminary symbols S which are examined. Since the total signal value should be correct, amplitude control is performed in terms of the expected value.

The circuit 17 for clock acquisition issues a clock pulse which still has deviations in terms of phase and frequency.

To implement the actual clock acquisition, many symbols are sorted in terms of their position relative to the desired radii within a distribution grid. After n symbols have thus been sorted, the distribution pattern is analyzed. For example, the sum of the symbols on the desired radii, or the sum of the symbols within a certain tolerance zone around the desired radii, can be examined, possibly using a weighting. Alternative examination techniques are also possible in regard to sums of symbols within the intermediate spaces, or sums of the squares of the symbols per grid cell.

A table listing multiple test sequences at different phases illustrates the increasing improvement in the determined clock signals after continuous variation of the phase $\phi$ by a phase difference $\Delta\phi$:

| Sampling quality G | Grid (R) | $\Sigma(S(R))$ | $\Sigma(S(R)^2)$ |
|---|---|---|---|
| Poor | 1 2 1 2 2 1 3 1 1 | 14 | 26 |
| Better | 0 1 0 2 3 4 3 1 0 | 14 | 40 |
| Good | 0 0 0 4 6 4 0 0 0 | 14 | 68 |
| very good | 0 0 0 0 14 0 0 0 0 | 14 | 196 |

The first column shows the improvement in sampling quality G. The second column presents the number of symbols per grid at a predetermined grid distance around the desired radius. The third column shows that in each case a total sum value of 14 here is ascertained when the entire radius environment around the desired radius is examined. It is therefore expedient, when considering a simple sum, to examine preferably only a narrow region or weighted region around desired radius R. If, however, the square of the summed radii is considered, a noticeable improvement in sampling quality G is obtained from the resulting value, even when examining the entire grid region. This procedure is advantageously independent of the actual position of the desired radii, although the gain is taken into account.

By slightly varying the phase $\phi$ from step to step, an iterative improvement can be implemented by further increasing or decreasing the phase value.

By using this technique, an optimal phase $\phi$ can be determined and continuously monitored.

If the optimal phase changes during this procedure, the sampling frequency is consequently not yet correct. From the phase difference Δφ it is possible directly to derive the corresponding frequency f which needs to be adjusted.

After the carrier control locks in, the switch 502 (FIG. 5) can be toggled so that a normal decision-feedback sampling control is employed. As soon as the continuing parallel sampling monitoring detects a degradation in the quality value, the switch 502 is switched back to the other position to implement tracking and correction of the sampling clock.

Alternatively, it is also possible, for example, to examine differences between determined symbols relative to the next desired radius. A good phase is thus present given a small or non-existent difference. This method is particularly appropriate in connection with lowpass filtering for continuous measurement. The requirement of dividing the process up into individual tests is then eliminated.

The method is thus based on the fact that with correct sampling all the radii of the preliminary symbols fall on the desired radii, whereas during times between symbols the phase vector is en route from one symbol to the next and, since usually another symbol is triggered, and since the total signal is lowpass-filtered, the transitions are soft, with the result that the phase vector most likely will not be found on the desired radius. This method is advantageously completely independent of the state of the carrier control since the angle information for the preliminary symbol is ignored. The method here can operate using tests of n symbols each. The n symbols can be identical for different tests, or be new in each case. In this procedure, no control voltage is supplied which would correspond to the first derivative of the quality according to the phase. Control thus proceeds in a testing mode. The testing can be replaced by an indicated modulation of the sampling angle—which action results, given non-optimal sampling, in a modulation with the same frequency as the quality value. In addition, it is possible to design the sampling circuit and subsequent modules in double form in order to enable early/late measurement. It is also possible to employ a separate system for the actual signal part in the form of an additional system of corresponding circuit elements.

Although the present invention has been illustrated and described with respect to several preferred embodiments thereof, various changes, omissions and additions to the form and detail thereof, may be made therein, without departing from the spirit and scope of the invention.

What is claimed is:

1. A method for determining a sampling instant of a clock signal for a circuit for determining symbols (Se) with discrete amplitudes from a digitized signal S of a modulation method, comprising:
   sampling the digitized and demodulated signal at a selectable sampling phase and providing a quadrature sampled signal;
   determining a first radius R for the quadrature sampled signal;
   determining a first quality value G for the quadrature sampled signal based on a desired radius and the first radius R for a first sampling phase $\phi_i$ which is defined relative to a base clock instant;
   determining a second quality value G* based on the desired radius and a second radius R determined during a second sampling phase $\phi_{i2}$ that is varied relative to the first sampling phase $\phi_i$, the second sampling phase $\phi_{i2}$ defined as the first sampling phase $\phi_i$ plus Δφ; and
   comparing the first quality values G and the second quality value G* to ascertain which of the first and second quality values is better, and adjusting the selectable sampling phase based upon which of the first and second quality values is determined to be better.

2. The method of claim 1, where the digitized and demodulated signal S is at least one of a Phase-Shift Keying and a Quadrature Amplitude Modulation encoded signal.

3. The method of claim 1, where a frequency correction is determined based on at least one of the first and second quality values G and G* which are assigned to certain signals at time intervals, and based on at least one of the sampling phases $\phi_i$ and $\phi_{i2}$ employed thereby.

4. The method of claim 1, where the determination of the first and second quality values G and G* of the signals S is implemented at successive instants with the same sampling phase $\phi_i = \phi_{i2}$, and a required frequency correction is indicated based on a change in the first and second quality values G and G*.

5. The method of claim 1, where the first and second quality values G and G* of the signals are determined as a function of the distribution in the radial component R of the quadrature sampled signal over a plurality of sampling instances.

6. The method of claim 1, where the first and second quality values G and G* of the signals S are determined in the region of defined radii ($R_a$-$R_i$) of the modulation method within polar coordinates plane (R, α).

7. The method of claim 1, where the first and second quality values G and G* of the signals are determined in the region of one or more selected radii ($R_a$-$R_c$) from a plurality of radii of the modulation method.

8. The method of claim 6, where the first and second quality values G and G* of the signals S are determined only within defined tolerance zones ΔR around a radii ($R_b$).

9. The method of claim 5, where the first and second quality values G and G* of the signals are weighted in the regions around the radii ($R_a$-$R_i$).

10. The method of claim 1 where after a required shift of the sampling instant relative to the base clock has been determined, the base clock is shifted by a corresponding differential clock pulse duration.

11. The method of claim 1 where the clock pulse duration T of the base clock is corrected in response to a continuous change in the first and second quality values G and G* determined over a plurality of sampling instants.

12. A circuit comprising:
    a clock control device to output clock signals ($t_i$) at discrete sampling instants;
    a polar coordinate converter for determining at least one radial component R for quadrature signals S from a digitized signal sd with discrete amplitudes of a modulation method;
    at least one storage device to store operational parameters and a radial component R of the signals S;
    a control device to control the operational sequence and determine the sampling instant of the clock signal $t_i$, wherein
    at least one of the control device and additional components are constructed and designed
      to vary at least one of sampling phase $\phi_i$ and $\phi_{i2}$ of the clock signals ($t_i$) relative to a base clock instant of a base clock, and
      to determine quality values G and G* for signals which are determined for different varied sampling phases $\phi_i$ or $\phi_{i2}$, specifically, as a function of the determined radial component R of the signals S relative to the desired radius within the coordinate system of the radial component.

13. The circuit of claim 12, comprising a switching device for determining the clock signal $t_i$ based on a decision-feedback sampling control, or with a value of a varied sampling phase.

14. A method for determining a sampling instant of a clock signal for a circuit for determining symbols (Se) with discrete amplitudes from a digitized and demodulated quadrature signal S, comprising:

sampling the digitized and demodulated quadrature signal at a selectable sampling phase and providing a quadrature sampled signal;

determining a first radius R for the quadrature sampled signal;

determining a first quality value G for the quadrature sampled signal based on a desired radius and the first radius R for a first sampling phase $\phi_i$ which is defined relative to a base clock instant;

determining a second quality value G* based on the desired radius and a second radius R determined during a second sampling phase $\phi_{i2}$ that is varied relative to the first sampling phase $\phi_i$, the second sampling phase $\phi_{i2}$ defined as the first sampling phase $\phi_i$ plus $\Delta\phi$; and comparing the first quality value G and the second quality value G* to ascertain which of the first and second quality values is better, and adjusting the selectable sampling phase based upon which of the first and second quality values is determined to be better, where the comparing to ascertain which of the first and second quality values is better includes determining which one of the first and second quality values has more radius values lying on and in the immediate vicinity of the desired radius.

* * * * *